US008059379B2

(12) United States Patent
Saito et al.

(10) Patent No.: US 8,059,379 B2

(45) Date of Patent: Nov. 15, 2011

(54) LIGHTNING ARRESTOR

(75) Inventors: Hiroki Saito, Tokyo (JP); Hiroki Kajino, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 102 days.

(21) Appl. No.: 12/502,279

(22) Filed: Jul. 14, 2009

(65) Prior Publication Data

US 2010/0220423 A1 Sep. 2, 2010

(30) Foreign Application Priority Data

Mar. 2, 2009 (JP) ................................ 2009-048501

(51) Int. Cl.
*H02H 1/00* (2006.01)

(52) U.S. Cl. ....................................... 361/117; 361/127

(58) Field of Classification Search .......... 361/117–120, 361/127

See application file for complete search history.

(56) References Cited

U.S. PATENT DOCUMENTS

| | | | | |
|---|---|---|---|---|
| 4,989,115 | A * | 1/1991 | Bourdages et al. | 361/126 |
| 5,652,690 | A * | 7/1997 | Mansfield et al. | 361/127 |
| 5,757,604 | A * | 5/1998 | Bennett et al. | 361/127 |

FOREIGN PATENT DOCUMENTS

| | | | |
|---|---|---|---|
| JP | 10-162927 | A | 6/1998 |
| JP | 2003-092205 | A | 3/2003 |
| WO | 97/50098 | A1 | 12/1997 |

OTHER PUBLICATIONS

Official Action issued Jul. 26, 2011 in a corresponding JP application.

* cited by examiner

*Primary Examiner* — Danny Nguyen

(74) *Attorney, Agent, or Firm* — Buchanan Ingersoll & Rooney PC

(57) ABSTRACT

A plurality of insulation supports are provided around a zinc oxide component, and the zinc oxide component and a plurality of insulation supports are integrally molded into an insulation casing. The insulation casing has corrugations on its outer surface. A thin-thickness portion is provided between the corrugations. The thin-thickness portion is provided between the insulation supports.

13 Claims, 2 Drawing Sheets

LIGHTNING ARRESTOR

BACKGROUND OF THE INVENTION

1. Field of the Invention

The present invention relates to a lightning arrestor used to protect an electronic device from an abnormal voltage generated in a power supply system.

2. Description of the Related Art

Typically, a polymer type lightning arrestor used in an electric power station or a transformer substation includes internal components including a stack of zinc oxide components, terminal electrodes disposed on both ends of the stack of zinc oxide components, and a plurality of insulation supports made of glass fiber-reinforced plastic (FRP) or the like for connecting the terminal electrodes to each other. A polymer type lightning arrestor is formed by directly molding an insulation material such as a polymer into an insulation casing around these internal components.

In a short circuit test of the above-detailed lightning arrestor according to the IEC standard 60099-4, the zinc oxide component is failed by injecting an amount of energy that is larger than the zinc oxide component can tolerate. In this state, when a short-circuit current is flown through the lightning arrestor, a high-pressure high-temperature arc gas is generated in the lightning arrestor. As the inner pressure of the lightning arrestor increases due to the arc gas, the internal components may be explode and scatter within the lightning arrestor. However, the arc gas can be released outside of the lightning arrestor instantaneously if the insulation casing is opened before the inner pressure increases.

Japanese Patent Application Laid-open No. H10-162927 discloses a current-limiting unit as an exemplary technique for instantaneously releasing the arc gas generated in the lightning arrestor that has been short-circuited due to an excessive lightning surge. Japanese Patent Application Laid-open No. H10-162927 (see FIGS. 3 and 5), a thin-thickness portion having a smooth curvilinear surface such as a circular surface or an elliptical surface having a large curvature radius is provided on a part of the outer circumferential surface between the corrugations of a cylindrical insulation casing of a current-limiting unit. The thin-thickness portion is opened instantaneously and serves as a pressure-releasing portion to discharge the arc gas when the lightning arrestor receives an excessive lightning surge. In addition, the thin-thickness portion is provided to face a different direction from any neighboring cable support insulators in order to avoid the cable support insulators being damaged by the released arc gas.

Japanese Patent Application Laid-open No. 2003-92205 discloses a lightning arrestor having improved mechanical strength by supporting internal components with an insulation support such as fiber reinforced plastic (FRP). In this lightning arrestor, because the insulation material and the insulation support are integrally molded into an insulation casing, the freedom of the shape of the insulation casing is limited. In other words, it is difficult to provide a thin-thickness portion such as a circular surface or an elliptical surface having a large curvature radius as described in Japanese Patent Application Laid-open No. H10-162927.

The current-limiting unit disclosed in Japanese Patent Application Laid-open No. H10-162927 (see FIGS. 1 and 4) is used in a place where no load is applied in the lightning arrestor, as shown in FIG. 7 of the same document. In other words, it fails to provide any mechanical strength to support the zinc oxide component with an insulation casing made of polymer or the like by bonding the terminal electrode and the zinc oxide component. Moreover, this current-limiting unit has a structure similar to a distributor type lightning arrestor having a low current level. Therefore, the existing current-limiting unit also fails to satisfy the mechanical strength required in the support structure described above when it is used in, for example, a transformer substation.

In addition, the support structure disclosed in Japanese Patent Application Laid-open No. H10-162927 (see FIGS. 1 and 4) does not have a structure for preventing scattering of shattered portions that may be generated when the zinc oxide component is failed by the short-circuited lightning arrestor. Therefore, the shattered portions may be scattered away from the opening of the insulation casing as soon as the arc gas is released.

On the other hand, in the structure shown in FIG. 3(*c*) of Japanese Patent Application Laid-open No. 2003-92205, a part of or all of the spaces between the insulation supports of the insulation casing are opened in order to release pressure when an arc gas is generated by a short-circuit current flowing through the lightning arrestor. In this case, because there is no thin-thickness portion, it is difficult to control the pressure-releasing direction, and thus, the arc gas is released in an arbitrary direction. As a result, neighboring devices may be damaged by the released arc gas depending on the direction of release of the arc gas.

SUMMARY OF THE INVENTION

It is an object of the present invention to at least partially solve the problems in the conventional technology.

According to an aspect of the present invention, there is provided a lightning arrestor including a stack of nonlinear resistor elements; a pair of terminal electrodes disposed on either sides in a stacking direction of the nonlinear resistor elements; a plurality of insulation supports arranged around the nonlinear resistor elements, the insulation supports extending in the stacking direction and electrically connecting the terminal electrodes to each other; and an insulation casing that integrally covers the nonlinear resistor elements and the insulation supports and has a plurality of corrugations on an outer circumferential surface. The insulation casing is provided with a thin-thickness portion between the corrugations, a thickness of the insulation casing in the thin-thickness portion from an outer surface of the stack of the nonlinear resistor being less than other portion of the insulation casing.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a lightning arrestor according to the present invention will be described in detail with reference to the accompanying drawings. The embodiments are not intended to limit the scope of the present invention in any way.

Figure 1:
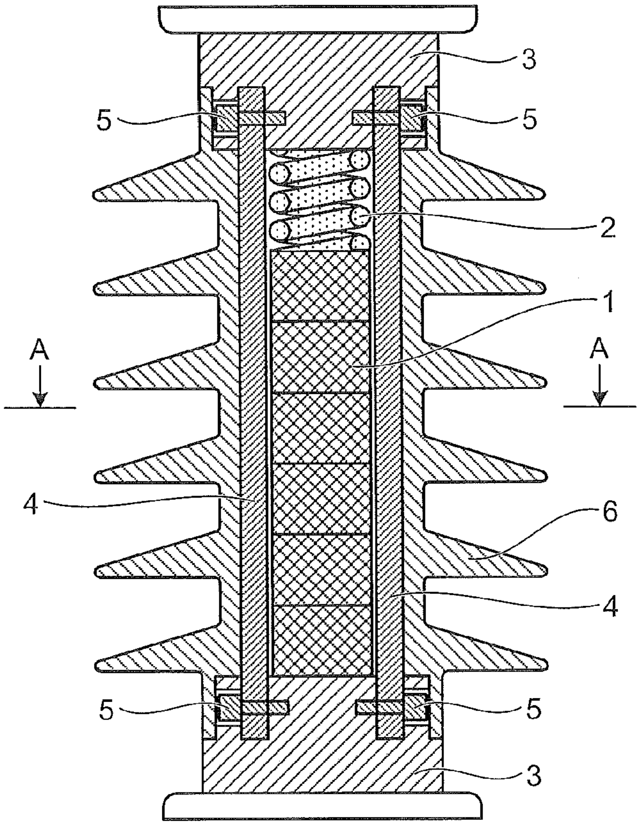
FIG. 1 is a longitudinal cross-sectional view of a lightning arrestor according to an embodiment of the present invention.
Figure 2:
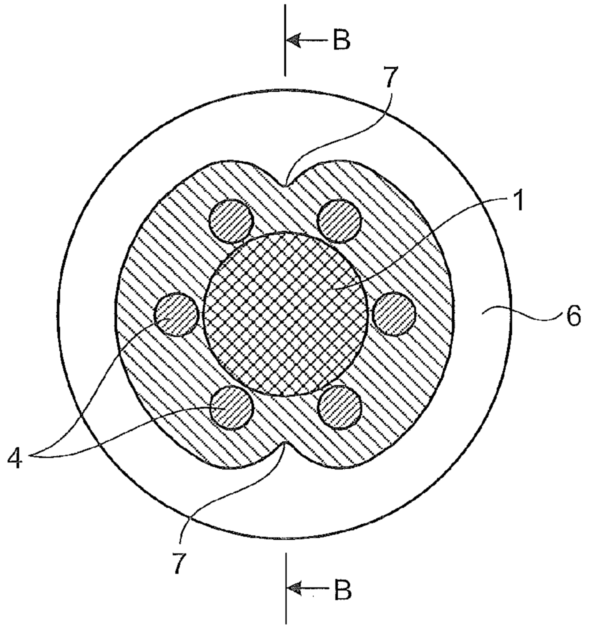
FIG. 2 is a transverse cross-sectional view along the line A-A of FIG. 1.
Figure 3:
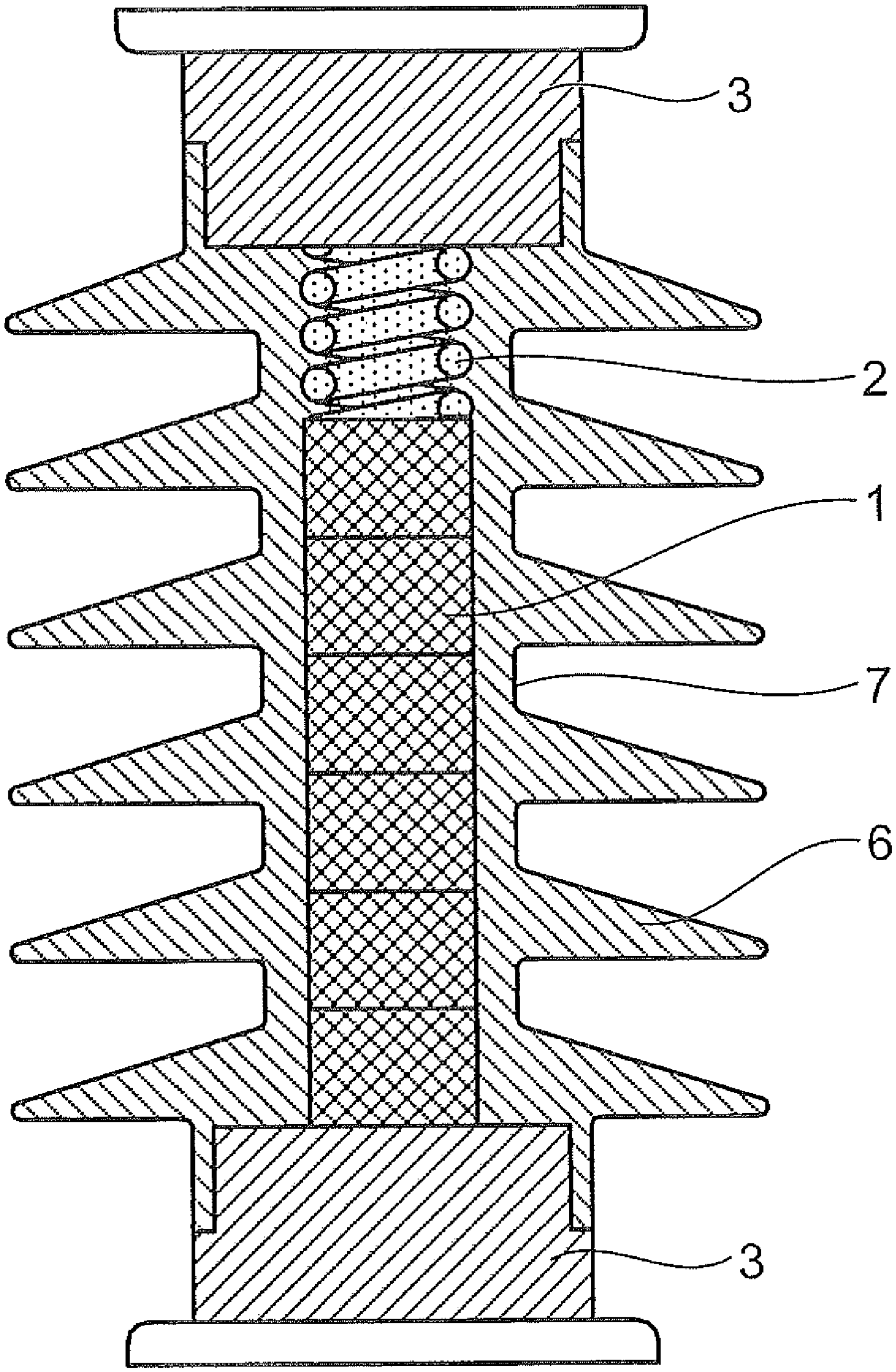
FIG. 3 is a longitudinal cross-sectional view along the line B-B of FIG. 2.

FIG. 1 is a longitudinal cross-sectional view illustrating a lightning arrestor according to an embodiment of the present invention. FIG. 2 is a transverse cross-sectional view along the line A-A of FIG. 1. FIG. 3 is a longitudinal cross-sectional view along the line B-B of FIG. 2. As shown in FIGS. 1 to 3, the lightning arrestor mainly includes, for example, a zinc oxide component 1 in the form of a stack of nonlinear resistor elements; a pressurization spring 2 disposed on top of the zinc oxide component 1; a pair of terminal electrodes 3 disposed on either sides of a stack assembly that includes the zinc oxide component 1 and the pressurization spring 2; a plurality of rod-shaped insulation supports 4 that extend in the direction of stacking of the zinc oxide component 1 around the zinc oxide component 1 in order to connect the terminal electrodes 3 to each other; and an insulation casing 6 that integrally covers at least the circumference of the stack assembly with the insulation supports 4.

In other words, in the lightning arrestor, the main internal components, i.e., the zinc oxide component 1, the pressurization spring 2, the terminal electrodes 3, and the insulation supports 4 are molded with an insulation material such as a polymer thereby forming the insulating casing 6. When assembling the internal components, the insulation supports 4 are fixed to the terminal electrodes 3 using, for example, bolts 5 with the pressurization spring 2 being retracted.

A single layer of the zinc oxide component 1 or a stack of a plurality of layers of the zinc oxide components 1 can be used. As shown in this example, a stack of zinc oxide components 1 constitutes a zinc oxide component block. In the present example, as shown in FIG. 2, the zinc oxide component 1 has a circular cross-section.

The insulation casing 6 has corrugations protruding on its outer circumference. The corrugations are formed at a fixed interval along the direction of stacking of the zinc oxide component 1, or along a longitudinal axial direction of the lightning arrestor (hereinafter, "axial direction". The insulation casing 6 is formed of, for example, silicone rubber.

FIG. 2 is a longitudinal cross-sectional view cut away along the line A-A of FIG. 1 and viewed along an arrow line, and shows the cross-section between the corrugations. As illustrated in FIG. 2, for example, six insulation supports 4 are provided at a fixed interval around the zinc oxide component 1. The insulation support 4 has, for example, a circular cross-section. The function of the insulation support 4 to provide mechanical strength and also prevent scattering of shattered portions of the zinc oxide component 1 when the lightning arrestor is short-circuited. From this point of view, it is preferable that the interval between the insulation supports 4 be short. Specifically, for example, it is preferable that three or more insulation supports are provided. In other words, the angle between the adjacent insulation supports 4 be 120° or less. The cross-sectional shape or the number of the insulation supports 4 is not limited to those mentioned above.

As illustrated in FIG. 2, the outer circumferential surface of the insulation casing 6 is provided with at least one thin-thickness portion 7 that is thinner than the rest of the zinc oxide component 1. The thin-thickness portion 7 is located between the insulation supports 4. The thickness of thin-thickness portion 7, i.e., the shortest distance between the surface of the zinc oxide component 1 and the outer surface of the insulation casing 6 at the thin-thickness portion 7 is preferably in the range of 3 millimeters (mm) to 5 mm. If the thickness is less than 3 mm, surface wastage may be generated by long-term fatigue. If the thickness is greater than 5 mm, the thin-thickness portion 7 will become difficult to open, leading to explosion of the lightning arrestor.

In the example of FIG. 2, two thin-thickness portions 7 are provided, for example, opposing each other in a radial direction. It should be appreciated that the locations and the number of the thin-thickness portions 7 are not limited to those mention above. In other words, one, or more that two, thin-thickness portions 7 can be provided between the insulation supports 4. However, as described later, in order to limit the pressure-releasing direction, the number of thin-thickness portions should preferably be one or two.

Furthermore, the thin-thickness portion 7 is formed along the shape of the insulation support 4. Moreover, the thickness between the insulation support 4 and the surface of the insulation casing 6 is preferably set to be 3 mm or more. If the thickness is less than 3 mm, surface wastage may be generated by any long-term fatigue, as described above.

In the example illustrated in FIG. 3, thin-thickness portions 7 are provided in a slit shape extending in the axial direction. That is, the thin-thickness portion 7 is elongated in the axial direction between the corrugations, and a plurality of the thin-thickness portions 7 extend in a straight manner in the axial direction through the corrugations. As shown in FIG. 3 the thin-thickness portions 7 are provided in between all the corrugations. Alternatively, the thin-thickness portion can be provided in between only some of the corrugations.

The operation of the present embodiment will now be described. When a short-circuit current flows through the lightning arrestor, a high-temperature and high-pressure arc gas is generated in the lightning arrestor. Some of the thin-thickness portions 7 are opened by pressure and temperature of the arc gas, so that the thin-thickness portions 7 are ruptured from this opened portion. The opened thin-thickness portions 7 progress to a pressure-relief opening having a sufficient area and the arc gas is released from this pressure-relief opening instantaneously.

A short circuit test according to the IEC standard 60099-4 was performed on the lightning arrestor. In the short circuit test, the zinc oxide component 1 was failed by a power frequency overvoltage within a short time period, and then, a short-circuit current of 63 kA was flown for 0.2 seconds. As a result, the thin-thickness portions 7 were ruptured from the opened portion to form a pressure-relief opening, and the arc gas was released through this pressure-relief opening. Explosive scattering of internal components such as the zinc oxide component 1 was not observed.

Effects of the present embodiment will now be described. In the present embodiment, the thin-thickness portions 7 are provided on an outer circumferential surface of the insulation casing 6. The thin-thickness portions 7 are opened by the pressure and temperature of the arc gas to form a pressure-relief opening and the arc gas is released to the outside from this pressure-relief opening. As a result, the arc gas can be instantaneously released to the outside.

In addition, a plurality of insulation supports 4 is provided around the zinc oxide component 1. This makes it possible to provide the mechanical strength required in an electric power station or a transformer substation. Also, the insulation supports 4 make it possible to prevent shattered portions of the component from being scattered.

In addition, because a pressure-relief opening is formed only in the thin-thickness portions 7, it is possible to control the pressure-relief direction.

In the present embodiment, the thin-thickness portions 7 are provided between the insulation supports 4 in a circumferential direction. Conversely, in Japanese Patent Application Laid-open No. H10-162927, the thin-thickness portion has a large circular or elliptical surface in order to avoid dust becoming attached thereto, however, it is difficult to form the thin-thickness portion together with the insulation supports 4. In contrast, in the present embodiment, the thin-thickness portions 7 are provided between the insulation supports 4 but does not extend across the insulation supports 4 to allow the thin-thickness portion 7 to be formed.

Furthermore, in the present embodiment, a plurality of thin-thickness portions 7 having a slit shape is provided in the axial direction. When any one of the thin-thickness portions 7 is opened by the arc gas, the thin-thickness portion 7 is ruptured in the axial direction from the opened portion. This makes it possible to provide a pressure-relief opening having a sufficient area to instantaneously release the arc gas. As a result, it is possible to instantaneously release the arc gas generated in the lightning arrestor with certainty even when a short-circuit current of 50 kA to 63 kA flows.

Conversely, in Japanese Patent Application Laid-open No. H10-162927 (see FIGS. 1 and 4), the thin-thickness portion is provided in only a part of the axial direction, and the area of the opening formed in the insulation casing when the pressure is released is small. Therefore, when a short-circuit current of a 50 kA to 63 kA class specified in the short circuit test according to the IEC standard flows, it may be impossible to entirely release the arc gas generated in the lightning arrestor instantaneously. On the contrary, in the present embodiment, a plurality of thin-thickness portions 70 having a slit shape are provided in the axial direction, particularly between the corrugations. This makes it possible to release the pressure with certainty even when a short-circuit current of 50 kA to 63 kA flows, as described above.

In addition, according to the present embodiment, for example, one or two thin-thickness portions 7 are provided in the circumferential direction of the insulation casing 6 in order to reduce the number of thin-thickness portions 7. This makes it possible to limit the pressure-relief direction.

In addition, the thin-thickness portions 7 are made to face a direction different from any neighboring device in order to prevent the released arc gas from damaging the neighboring device (not shown). Because the thin-thickness portions 7 are provided in an outer circumferential surface of the insulation casing 6 in practice, however, there is little possibility of erroneously placing the direction of the thin-thickness portion 7 in a damaging direction. The neighboring device may include a stay insulator, an aerial disconnector, or the like.

In addition, when installing the lightning arrestor, if the thin-thickness portions 7 are oriented so as to face in a direction other than a work area, even when a lightning arrestor is short-circuited during a test, it is possible to prevent the arc gas from affecting the maintenance crew.

According to an aspect of the present invention, a thin-thickness portion is opened by the arc gas as a pressure-relief opening. The arc gas can be instantaneously released through the pressure-relief opening. Moreover, because the pressure-relief opening is formed only in the thin-thickness portion, it is possible to limit the pressure-relief direction.

In addition, insulation supports provide the mechanical strength to the lightning arrestor required in an electric power station or a transformer substation. Also, the insulation support makes it possible to prevent shattered portions of the component from being scattered around.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A lightning arrestor comprising:

a stack of nonlinear resistor elements;

a pair of terminal electrodes disposed on either sides in a stacking direction of the nonlinear resistor elements;

a plurality of insulation supports arranged around the nonlinear resistor elements, the insulation supports extending in the stacking direction and electrically connecting the terminal electrodes to each other; and an insulation casing that integrally covers the nonlinear resistor elements and the insulation supports and has a plurality of corrugations on an outer circumferential surface, wherein the insulation casing is provided with a thin-thickness portion between the corrugations, a thickness of the insulation casing in the thin-thickness portion from an outer surface of the stack of the nonlinear resistor being less than other portion of the insulation casing.

2. The lightning arrestor according to claim 1, wherein the thin-thickness portion is provided between the insulation supports in a circumferential direction of the insulation casing.

3. The lightning arrestor according to claim 1, wherein a plurality of the thin-thickness portions having a slit shape is provided in the stacking direction.

4. The lightning arrestor according to claim 2, wherein a plurality of the thin-thickness portions having a slit shape is provided in the stacking direction.

5. The lightning arrestor according to claim 1, wherein one or two thin-thickness portions are provided in the circumferential direction.

6. The lightning arrestor according to claim 2, wherein one or two thin-thickness portions are provided in the circumferential direction.

7. The lightning arrestor according to claim 3, wherein one or two thin-thickness portions are provided in the circumferential direction.

8. The lightning arrestor according to claim 4, wherein one or two thin-thickness portions are provided in the circumferential direction.

9. The lightning arrestor according to claim 1, wherein the thin-thickness portion faces a different direction from a neighboring device.

10. The lightning arrestor according to claim 2, wherein the thin-thickness portion faces a different direction from a neighboring device.

11. The lightning arrestor according to claim 3, wherein the thin-thickness portion faces a different direction from a neighboring device.

12. The lightning arrestor according to claim 5, wherein the thin-thickness portion faces a different direction from a neighboring device.

13. The lightning arrestor according to claim 1, wherein the thin-thickness portions are provided in between substantially all the corrugations.

* * * * *